June 2, 1964  J. G. SCHABERG  3,135,121
COMBINATION STABILIZATION GYROSCOPE AND ACCELEROMETER
Filed Aug. 5, 1960

INVENTOR.
Johannes G. Schaberg
BY
Paul J. Ethington
ATTORNEY

United States Patent Office 3,135,121
Patented June 2, 1964

3,135,121
COMBINATION STABILIZATION GYROSCOPE
AND ACCELEROMETER
Johannes G. Schaberg, Berlin, Wis., assignor to General
Motors Corporation, Detroit, Mich., a corporation of
Delaware
Filed Aug. 5, 1960, Ser. No. 47,697
9 Claims. (Cl. 74—5.6)

This invention relates to an accelerometer device and more particularly to a stabilizing gyroscope for detecting angular rate or displacement in combination with a linear accelerometer.

Heretofore gyroscope assemblies have been limited to detection of angular rate or displacement and, when it was desired to know what linear acceleration was taking place, it was necessary to provide a separate linear accelerometer. This necessitated additional space, weight and expense which, in automatic pilots and especially in missile guiding systems, must be kept to an absolute minimum.

An object of this invention is to eliminate a separate accelerometer by providing a unitary combination of a stabilization gyroscope with a linear accelerometer. Another object of the invention is to provide an accelerometer wherein the gimbal mass and the mass of the spin rotor are utilized as the inertial mass of the linear accelerometer.

The invention is accomplished by a gyroscope adapted to spin on a gimbal and having the gimbal mounted to permit rotational movement and also limited linear movement along the axis of gimbal rotation or output axis. A sensing device detects precession about the output axis as is customary in stabilization gyroscopes, and means is provided to sense the axial displacement of the gimbal thereby affording an indication of acceleration in the direction of the gimbal axis.

Figure 1:
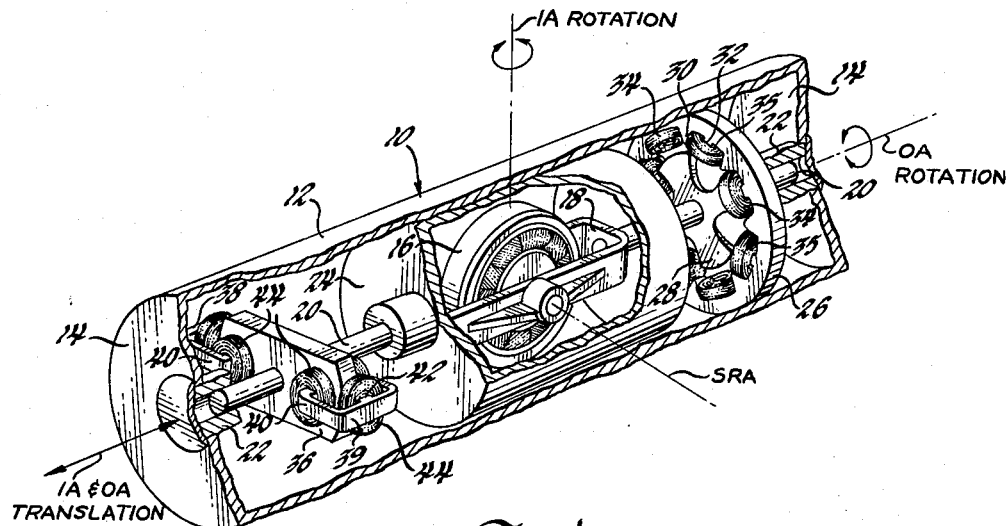
Figure 2:
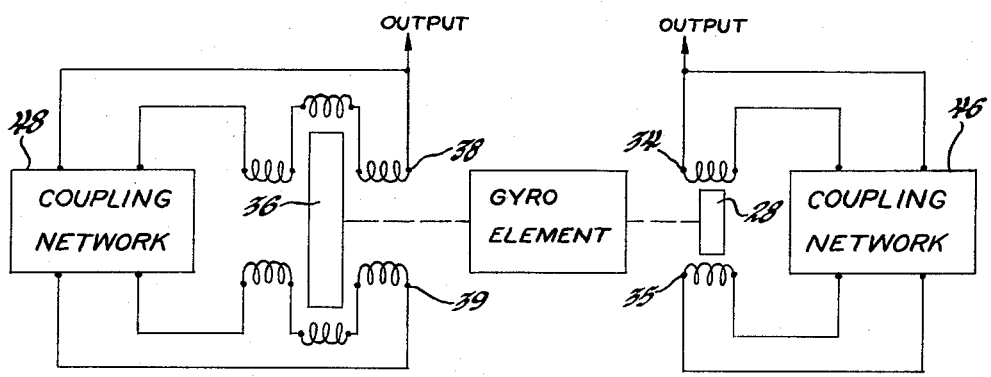

The above and other advantages of the invention will become more apparent by reference to the following specification along with the accompanying drawings wherein like numerals refer to like parts and wherein:

FIGURE 1 is a partly broken away view of a combination stabilization gyroscope and accelerometer according to the present invention; and FIGURE 2 is a schematic circuit diagram of the electrical control system for the mechanism of FIGURE 1.

Referring to FIGURE 1, there is shown an embodiment of the invention in a single degree of freedom integrating gyroscope. A gyroscope casing 10 comprises an elongated cylindrical side wall 12 closed at either end by the disk-like end walls 14. A gyro rotor 16 within the casing 10 is rotatably mounted on a gimbal 18 and defines the spin reference axis SRA of the gyroscope. The gimbal 18 has a pair of axially aligned shaft portions or trunnions 20 extending toward the end plates 14 of the casing 10. A hollow cylindrical bearing 22 extending inwardly from each end plate 14 provides a means for supporting the trunnions 20 for rotation about the output axis OA and, in addition, allows translational movement of the gimbal 18 along axis OA. A cylindrical float 24 surrounds the gyro rotor 16 and is secured to the gimbal trunnions 20. The float 24 is concentric with the outer casing 10 and has a small clearance with the inner walls of the outer casing. The space between the float 24 and the outer casing 10 is filled with a viscous liquid to provide damping and buoyant support for the float 24.

A microsyn 26 combining a signal generator and torque generator, as seen in FIGURE 1, is located between the float chamber 24 and the right bearing 22. The microsyn 26 includes a four-poled rotor 28 attached to the right trunnion, and a stator 30 secured to the casing 10 in the same plane as the rotor 28 has eight poles 32 extending inwardly toward the rotor. Each of the eight poles 32 is wound with a coil 34 or 35 such that a series of alternate coils 34 serves a signal generator detecting rotation of the rotor 28 while the remaining series of coils 35 acts as a torque generator tending to constrain the rotor 28 toward neutral position.

The left-hand gimbal trunnion 20 carries a flat, elongated armature 36 having rounded ends. A pair of diametrically opposed E-core inductive units 38 and 39 is mounted on the inner walls of the casing 10 so that the elongated outer legs 40 of each unit will embrace one end of the armature while the short central leg 42 is in substantially the same plane as the armature 36. Each of the legs is wound with a coil 44 such that, due to the inductive coupling between the armature 36 and the coils 44, one of the units 38 will generate a signal in proportion to axial movement of the armature and the other unit 39 acts as a force generator to counteract the axial movement of the armature 36 thereby constraining the armature to zero or near zero displacement. This arrangement in combination with the unbuoyed mass of the gyro and gimbal assembly acts as a linear accelerometer.

As stated previously, the float 24 is completely submerged in a floatation fluid. This fluid provides a damping of the float 24 to help restrain rotation of the gyro and gimbal assembly and, in addition, buoys the float to relieve the bearings 22 of the weight of the gyro and gimbal assembly. In conventional gyroscopes it is permissible to exactly balance the float so that no weight will rest on the bearings 22 and friction will be essentially eliminated. However, in the present invention the linear accelerometer requires an unbalanced movable inertial mass which is used to detect acceleration along the axis of movement OA. Accordingly, the float must be slightly over-floated or under-floated in order to provide an inertial mass. This can be done without creating more than a negligible amount of friction in the suspension bearings. If desired, an auxiliary suspension system of the magnetic centering type (not shown) may be used to completely eliminate bearing friction.

As the casing 10 of the assembly is accelerated in the direction of the output axis OA all the parts rigidly connected to the gimbal will be displaced in the direction of the axis OA. When the bearing friction is kept small the acceleration to which the device will respond will be very small.

FIGURE 2 schematically illustrates the electrical circuitry involved. The signal generating pickups 34 on the microsyn 26 send a signal to a coupling network 46 which generates an electrical input that is a desired function of the amount of gyro precession. This input is fed to the torque generator windings 35 to balance the microsyn rotor 28 according to the predetermined function. Similarly, the signal voltage generated by the linear displacement sensing coils 38 is fed to a coupling network 48 which amplifies the signal and modifies it so that, when it is fed to the force generator coils, it will tend to constrain the armature toward a neutral position. The output voltages from the two sets of signal generating coils 34 and 38 are fed to an external computer or control circuit (not shown).

Thus, it may be seen that the invention described herein provides a compact unit for detecting linear acceleration as well as angular movement. An angular rate about the input axis IA (rotation), which is mutually perpendicular to the output axis OA (rotation) and the spin reference axis SRA, causes a corresponding precession about the output axis OA (rotation) which is detected by the signal generating portions of the microsyn. The output signal is modified by the coupling network and fed to the torque generation portion of the microsyn to counteract the precessional torque on the gimbal assembly. Translational acceleration along the output axis OA is detected by the pickup which generates a signal which is modified by the coupling network and fed to the force generating unit to counteract the translational force on the gimbal assembly.

Alternative constructions within the spirit of the invention are many. For example, the device could operate successfully if the gyroscope were of the non-floated type, if different types of pickups were utilized or if spring type or other restraining means were substituted for the inductive torque and force generators.

The form of the invention described herein is for illustrative purposes and is merely the preferred embodiment and is not to be taken to limit the scope of the invention which is defined in the following claims.

I claim:

1. In an accelerometer a single degree of freedom gyroscope having a spin reference axis, an input axis and an output axis, said axes being mutually perpendicular, mounting means for said gyroscope permitting translational freedom along said output axis, means for measuring the rotational displacement of said gyroscope about said output axis thereby determining the angular rate about said input axis, and means for measuring the linear displacement of said gyroscope thereby determining the acceleration along the output axis.

2. In an accelerometer a single degree of freedom gyroscope having a spin reference axis, an input axis and an output axis, said axes being mutually perpendicular, mounting means for said gyroscope permitting translational freedom along said output axis, means for measuring the angular displacement of said gyroscope about said output axis thereby determining the angular rate about said input axis, means for constraining said gyroscope toward zero rotational displacement position, means for measuring the linear displacement of said gyroscope thereby determining the acceleration along the output axis, and means for constraining said gyroscope toward zero linear displacement position.

3. In an accelerometer a single degree of freedom gyroscope having a spin reference axis, an input axis and an output axis, said axes being mutually perpendicular, mounting means for said gyroscope permitting translational freedom along said output axis, means for measuring the angular displacement of said gyroscope about said output axis thereby determining the angular rate about said input axis, means responsive to said measuring means for constraining said gyroscope toward zero rotational displacement position, means for measuring the linear displacement of said gyroscope thereby determining the acceleration along the output axis, and means responsive to the latter measuring means for constraining said gyroscope toward zero linear displacement position.

4. In an accelerometer a single degree of freedom gyroscope having a spin reference axis, an input axis and an output axis, said axes being mutually perpendicular, mounting means for said gyroscope permitting translational freedom along said output axis, said gyroscope including a float immersed in a liquid for buoying the gyroscope to approximately counterbalance the gyroscope weight, means for measuring the angular displacement of said gyroscope about said output axis thereby determining the angular rate about said input axis, and means for measuring the linear displacement of said gyroscope thereby determining the acceleration along the output axis.

5. An accelerometer comprising a gyro rotor, a frame rotatably carrying said rotor, means causing said rotor to spin, a housing supporting said frame for rotational and restrained linear movement along the axis of rotation of said frame, said frame axis of rotation being perpendicular to the spin axis of said gyro rotor, sensing means to detect angular displacement and linear displacement of said frame whereby angular acceleration about an axis mutually perpendicular to the spin axis and the frame axis and linear acceleration along said frame axis are measured.

6. An accelerometer comprising a gyro rotor, a gimbal carrying said rotor, means on said gimbal causing said rotor to spin, a casing supporting said gimbal and affording rotary and limited linear freedom with respect to the axis of rotation of said gimbal, sensing means to detect gimbal rotation, and sensing means to detect linear displacement of said gimbal whereby acceleration in the direction of the gimbal axis is measured.

7. An accelerometer comprising a gyro rotor, a gimbal carrying said rotor, means on said gimbal causing said rotor to spin, a casing supporting said gimbal and affording rotary and limited linear freedom about the axis of rotation of said gimbal, sensing means to detect gimbal rotation, means responsive to said sensing means to constrain the gimbal toward a neutral angular position, sensing means to detect linear displacement of said gimbal whereby acceleration in the direction of the gimbal axis is measured, and means responsive to the latter sensing means to constrain the gimbal toward a neutral linear position.

8. An accelerometer comprising a gyro rotor, a gimbal carrying said rotor, means on said gimbal causing said rotor to spin, a casing supporting said gimbal and affording rotary and limited linear freedom with respect to the axis of rotation of said gimbal, a float mounted on said gimbal and surrounding said rotor, a liquid filling said casing for buoying the gyro and gimbal assembly to nearly counterbalance the weight of said assembly, sensing means to detect gimbal rotation, and sensing means to detect linear displacement of said gimbal whereby acceleration in the direction of the gimbal axis is measured.

9. An accelerometer apparatus comprising an outer casing, a support member rotatably journaled within said casing, means permitting movement of said support member with respect to said casing along the axis of rotation of said support member, a gyro rotor rotatably carried by said support member, means for causing the rotor to spin about an axis perpendicular to the axis of said support frame, a float mounted on said support frame and surrounding said gyro rotor, a viscous floating and damping fluid between the float and said casing, a combined signal generator and torque generator microsyn comprising a rotor connected to the support member for rotational movement therewith and a stator stationary relative to said casing, windings on said stator for producing a signal indicative of rotational rotor displacement, an electrical network to modify said signal according to a desired function, torque windings on said stator energized by the output signal of said network for restraining the rotor from displacement, a combined signal generator and force generator comprising an armature secured to said support member for axial movement therewith, an inductive E-core pickup stationary relative to said casing for producing a signal indicative of axial armature displacement, a second electrical network to modify said signal according to a desired function, and an inductive E-core force generator energized by the output signal from said second electrical network for restraining axial displacement of said armature.

References Cited in the file of this patent

UNITED STATES PATENTS

| | | |
|---|---|---|
| 2,334,002 | Heintz et al. | Nov. 9, 1943 |
| 2,752,790 | Draper | July 3, 1956 |
| 2,852,208 | Schlesman | Sept. 16, 1958 |
| 2,878,006 | Sedgfield et al. | Mar. 17, 1959 |
| 2,925,736 | Mueller | Feb. 23, 1960 |